United States Patent

[11] 3,617,067

[72] Inventor Itsuki Ban
829, Higashi-Oizuminachi, Nerima-ku, Tokyo-to, Japan

[21] Appl. No. 817,957
[22] Filed Apr. 21, 1969
[45] Patented Nov. 2, 1971
[32] Priorities Apr. 27, 1968
[33] Japan
[31] 43/27989;
Oct. 2, 1968, Japan, No. 43/71141

[54] ENDLESS MAGNETIC TAPE CARTRIDGE CASE
5 Claims, 8 Drawing Figs.

[52] U.S. Cl. .......... 274/4 A, 179/100.2 CA, 179/100.2 MD, 179/100.2 Z
[51] Int. Cl. .......... G11b 21/08, G11b 1/00
[50] Field of Search .......... 274/4 C, 4 B, 4 G, 4 A, 11 A, 11 B, 11 C; 179/100.2 Z, 100.2 CA, 100.2 MI; 242/197–200, 55.19 A

[56] References Cited

UNITED STATES PATENTS

| | | | |
|---|---|---|---|
| 2,466,514 | 4/1949 | Vatborg | 179/100.2 |
| 3,037,093 | 5/1962 | Nowlan | 179/100.2 |
| 2,083,269 | 3/1963 | Gaubert | 274/4 F UX |
| 3,247,328 | 4/1966 | Mitchell | 274/4 F UX |
| 3,315,041 | 4/1967 | Sampson | 179/100.2 MI |
| 3,431,367 | 3/1969 | Nickl | 274/4 F UX |

*Primary Examiner*—Leonard Forman
*Assistant Examiner*—Dennis A. Dearing
*Attorney*—Jacobs & Jacobs ABSTRACT: A case storing an endless magnetic tape cartridge having a tape providing a plurality of playing tracks and received in a tape cartridge player including a track-changing device having a track selection control member, said case comprising a base portion, a wall portion consisting of a front wall, two sidewalls and rear wall each of which extends upwardly from the base portion, a cover member resting atop the wall portion, and a partition wall extending upwardly from the base portion. A cartridge receptacle is formed by being encased by the partition wall, the front wall, one of the sidewalls and the rear wall, and an opening is provided in the front wall opposite to the leading edge of the tape cartridge, and a plurality of track selection members is provided in the front wall to correspond to each of the playing tracks on the tape for selectively operating the track selection device.

ENDLESS MAGNETIC TAPE CARTRIDGE CASE

The present invention relates to a case for storing an endless magnetic tape cartridge and more specifically to a case received in a tape cartridge player having a track or channel-changing device including a track selection control element and being capable of selectively operating the track selection control member.

A tape cartridge player for the tape cartridge having an endless magnetic tape with a plurality of playing tracks or channels is provided with a track-changing device. One of the track-changing devices of the type comprises a rotary cam vertically moving a magnetic head, a solenoid for driving the rotary cam, a switch head for controlling a supply of current to the solenoid including two contacts shorted by an end mark of conducting foil on the tape whereby the solenoid is actuated in response to the end mark as passing through the switch head so that magnetic head is caused to be successively moved to a position to correspond to the playing track on the tape. In this manner of the track-changing device, the entire playing track on the tape is successively reproduced. Generally, the entire track on the tape is not desired to be reproduced but only a specific track thereon is desired by the user. To this end, a track selection control member is provided for the track-changing device to select the track to be reproduced as will be detailed hereinafter. The track selection control member, for example, comprises a manually operated electrical switch corresponding to each of the playing tracks whereby a supply of current to the solenoid is controlled to move the magnetic head to a position corresponding to the indexed track. As a result, one or more tracks indexed by the track selection control member are successively reproduced. In use, it is desired that this track selection control member is automatically operated by inserting the tape cartridge into the tape player. Particularly, in the tape player of the class storing a plurality of cartridges therein to play the latter in succession, it is preferred that the track selection control member is suitably operated according to the cartridge to be played.

It is, therefore, a principal object of the invention to provide a case which stores a tape cartridge having an endless magnetic tape providing a plurality of playing tracks and including track selection means indexing some of the tracks to be reproduced.

Another object of the invention is to provide a case that is received in an endless magnetic tape cartridge player with a track-changing device having a track selection control member whereby the track selection control member is suitably operated by track selection means to automatically reproduce the preindexed track.

A further object of the invention is to provide a case which is provided with an opening suitably fitted to the leading edge of a tape cartridge and in which a magnetic tape or a pinch roller provided within the cartridge is engaged through the opening with a magnetic head and a rotary-driving capstan in a tape player.

Still another object of the invention is to provide a case wherein the track selection means comprises a plurality of slidable levers corresponding to the tracks on the tape and the track to be reproduced is indexed by adjusting the length of the lever projecting from a front wall.

Yet another object of the invention is to provide a case wherein the track selection means comprises a plurality of holes corresponding to the tracks on the tape and means for closing the holes properly and the track to be reproduced is indexed by selectively closing the hole. Other objects and advantages of the invention will be apparent from the following description of the preferred embodiments of the invention taken in connection with the accompanying drawings in which.

Figure 1:
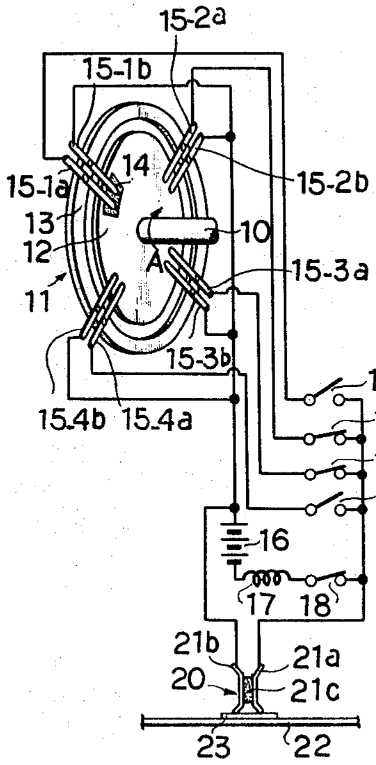
FIG. 1 is a wiring diagram showing a track- or channel-changing device in a tape player utilizing an endless magnetic tape cartridge.
Figure 6:
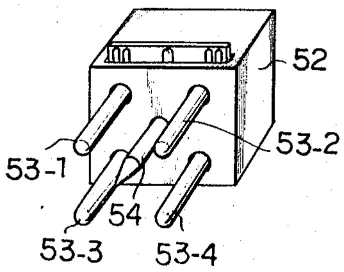

FIG. 6 is a perspective view of a modified form of a switch mechanism including the switches in FIG. 1. FIG. 1 shows one type of track- or channel-changing devices in a tape player for a tape cartridge provided with an endless magnetic tape having four tracks or four channels (eight tracks). In FIG. 1, the reference numeral 10 designates a cam shaft to which a cam (not shown) is secured for moving a magnetic head (not shown) included in the tape player to a position corresponding to each of recording tracks on the magnetic tape. The cam shaft 10 is connected by a ratchet mechanism (not shown) to a plunger (not shown) of a solenoid means 17 and rotated at a predetermined angle in the direction of arrow A. The cam shaft 10 is provided with a rotary switching means 11. The switching means 11 comprises a rotary disc 12 of an insulation fixed to the cam shaft 10, a fixed ring 13 of an insulation concentrically provided in relation to the rotary disc 12, a conducting piece 14 secured to the surface of the rotary disc 12, and pairs of electrical contacts "15–1*a*, 15–1*b*," "15–2*a*, 15–2*b*,ay" "15–3*a*, 15–3*b*," and "—4*a*, 15–4*b*" each pair being disposed in spaced relationship on the surface of the fixed ring 13. Each pair of electrical conducts is shorted by the conducting piece 14 as the rotary disc 12 is rotated. In series, running from a minus terminal of a power source 16 to a plus terminal of the power source 16 are a solenoid 17, normally closed switch 18 and 19– 1 and the pair of the electrical contacts 15–1*a*, 1*b*. The switch 18 is operated by a reciprocating plunger (not shown) of the solenoid means 17 and opened when the solenoid 17 is energized. In series, running from minus terminal of the power source 16 to plus terminal of the power source 16 are the solenoid 17, the switch 18, a normally closed switch 19 and the pair of the electrical contacts 15–2*a*, 2*b*. In series, running from minus terminal of the power source 16 to plus terminal of the power source 16 are the solenoid 17, the switch 18, the normally closed switch 19–3, and the pair of the electrical contacts 15–3*a*, 3*b*. In series, running from minus terminal of the power source 16 to plus terminal of the power source 16 are the solenoid 17, the switch 18, the normally closed switch 19–4, and the pair of the electrical contacts 15–4*a*, 4*b*. In series, running from minus terminal of the power source 16 to plus terminal of the power source 16 are the solenoid 17 and a switch head 20. The switch head 20 consists of two electrical contacts 21*a*, 21*b* that are shorted by an end mark 23 of conducting foil provided on an endless magnetic tape 22 within a cartridge (not shown) and a member 21*c* of an insulation for supporting the contacts 21*a*, 21*b*. The switches 19–1, 19–2, 19–3 and 19–4 each correspond to respective four-playing tracks (not shown) on the magnetic tape 22 and are adapted to effect the selection of the track to be played. In FIG. 1 there is shown that the switches 19–1 and 19–4 are opened to index the first and fourth tracks while the first track is being reproduced. When reproduction of the first track is completed and the end mark 23 shorts the contacts 21*a*, 21*b* of the switch head 20, the solenoid 17, is energized by the power source 16 to rotate the cam shaft 10 in the direction of arrow A. With rotation of the cam shaft 10, rotary disc 12 is rotated to a position where the conducting piece 14 shorts the electrical contacts 15–2*a*, 2*b*. The solenoid 17 is deenergized in a moment as the end mark 23 leaves the switch head 20 but energized again by the power source 16 through the switch 18, the switch 19–2 the electrical contacts 15–2*a*, the conducting piece 14 and the electrical contacts 15–2*b*. The rotary disc 12 is thus rotated to a position where the conducting piece 14 shorts the electrical contacts 15–3*a*, 15–3*b*. By allowing the conducting piece 14 to leave the contacts 15–2*a*, 15–2*b* and opening the switch 18 by means of the plunger (not shown) of the solenoid 17, the solenoid 17 is deenergized. Again, the solenoid 17 is energized by the power source 16 through the switches 18, 19–3, the electrical contact 15–3*a*, the conducting piece 14, and the electrical contact 15–3*b* to rotate the rotary disc 12 to a position where the conducting piece shorts the contacts 15–4*a*, 15–4*b*. Since the conducting piece 14 leaves the contacts 15–3*a*, 15–3*b* and the switch 19–4 is opened, the solenoid 17 is deenergized and is no longer supplied with current. As a result, reproduction of the fourth track on the tape corresponding to the switch 19–4 is initiated. Upon completion of reproduction of the fourth track and shorting the contacts 21*a*, 21*b* of the switch head 20 by means of the end mark 23, the solenoid 17 is energized by the power source 16 to rotate the rotary disc 12 to a position where the conducting piece 14 shorts the electrical contacts 15–1*a*, 15–1*b*. By admitting the end mark 23 to leave the switch head 20 and the switch 19–1 to be opened, the solenoid 17 is deenergized and is no longer supplied with current. Thus, reproduction of the first track on the tape corresponding to the switch 19–1 is initiated. Upon repetition of the operation as set forth in the above, the magnetic tape 22 is successively reproduced at the first and fourth tracks. It will be understood that if all the switches 19–1, 19–2, 19–3 and 19–4 are opened all the four tracks are played in sequence.

The switches 19–1, 19–2, 19–3 and 19–4 are selectively operated by a track selection means of the case, as will be hereinafter described, according to the present invention.

Figure 2A:
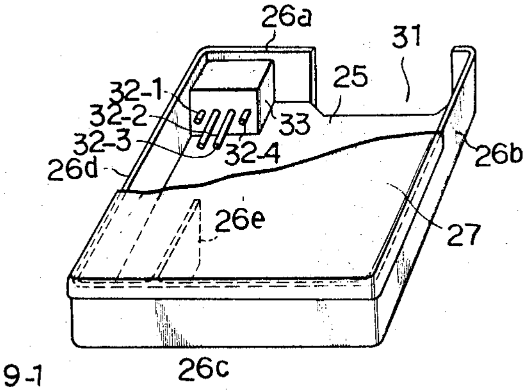
FIG. 2A is a perspective view of one embodiment of a case according to the invention with a portion thereof being broken away.
Figure 2B:
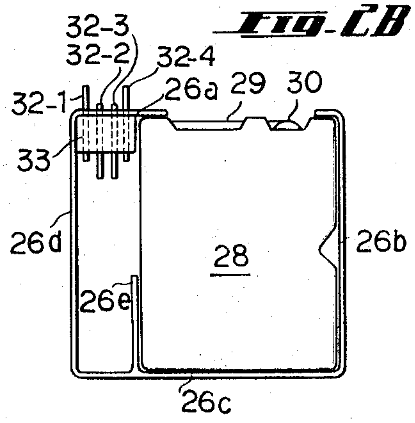
FIG. 2B is a plan view of the case shown in FIG. 2A, in which the endless magnetic tape cartridge is stored with the cover member being removed therefrom.

FIGS. 2A and 2B illustrate one embodiment of a case in accordance with the invention. The case includes a base portion 25, a front wall 26*a*, sidewalls 26*b*, 26*d* and a rear wall 26*c* each of which upwardly extends from the base portion 25, a partition wall 26*e* upwardly extending from the base portion so as to perpendicular to the rear wall 26*c*, and a cover member 27. The space substantially encircled by the front wall, sidewalls, rear wall and the partition wall is of dimensions to accommodate an endless magnetic tape cartridge 28. A portion of a stored endless magnetic tape 29 and of a pinch roller 30 are exposed to the exterior of the cartridge 28 by projecting from a window (not shown) formed in a leading edge 28*a* of the cartridge. The front wall 26*a* has an opening 31 opposed to the leading edge 28*a* of the cartridge 28. The opening 31 is of a dimension slightly less than the leading edge 28*a* in width and more than the window (not shown). Four selection levers 32–1, 32–2, 32–3 and 32–4 are slideably mounted on a block 33 provided on the base portion 25 to correspond to four playing tracks (not shown) on the endless magnetic tape 29. One end of each selection lever projects from each hole (not shown) formed in the front wall 26*a* outwardly of the case and the other end projects from each bore (not shown) formed in the block 33 inwardly of the case. The selection lever is adapted to be movable by manually pulling it at tip end thereof or pushing it at rear end thereof toward the first position or the second position.

In operation, the case is set to the endless magnetic tape cartridge player (not shown). The switches 19–1, 19–2, 19–3, and 19–4 (FIG. 1) in the cartridge player are arranged at a position so as to be confronted to the tip end of each of the selection levers 32–1, 32–2, 32–3, and 32–4 and each of the switches are adapted to be operated by the selection lever in the first position. In FIGS. 2A and 2B, the selection levers 32–1 and 32–2 are in the first position, and thus the switches 19–1, 19–4 are operated. Accordingly, the tape 29 in the cartridge 28 stored in the case may be reproduced at the first and the fourth tracks. That is to say, a selection lever which corresponds to the track desired to be reproduced on the tape, is moved to the first position beforehand and another selection lever is moved to the second position to automatically reproduce the track as desired.

Figure 3A:
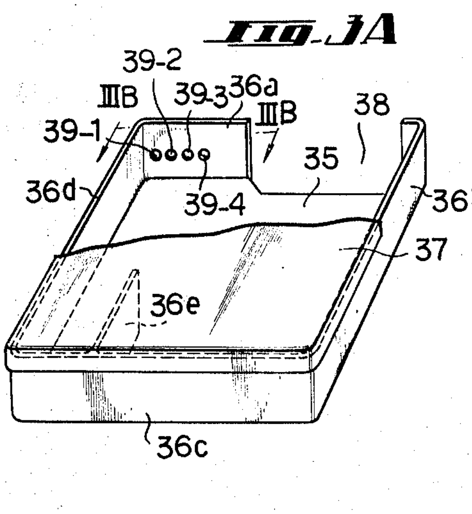
FIG. 3A is a perspective view of an alternative embodiment of the case with a portion thereof being broken away.
Figure 3B:
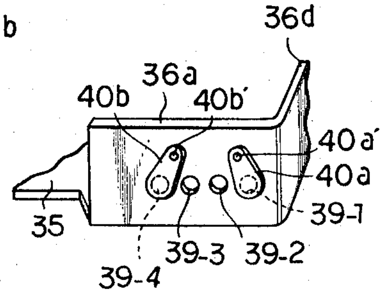
FIG. 3B is a perspective view of the case wall, looking in the direction of the arrows IIIB—IIIB.

FIGS. 3A and 3B show an alternative embodiment of the case according to the invention, the case, as is similar to the embodiment shown in FIGS. 2A and 2B, comprises a base portion 35, front wall 36*a*, sidewalls 36*b*, 36*d* and a rear wall 36*c* each of which upwardly extends from the base portion 35, a partition wall 36*e* upwardly extending from the base portion so as to be perpendicular to the rear wall 36*c*, and a cover member 37. The front wall 36*a* is provided with an opening 38 similar to the opening 31 (FIG. 2A). The tape cartridge is accommodated in the space encircled by the front wall 36*a*, sidewalls 36*b*, 36*d*, rear wall 36*c* and the partition wall 36*e*. The front wall 36*a* has four holes 39–1, 39–2, 39–3 and 39–4, levers 40*a*, 40*b* pivotally provided on the exterior of the front wall by means of pivot pins 40*a'* and 40*b'*. By rotating the lever 40*a* manually about the pivot pin 40*a'*, the lever 40*a* is caused to be moved to a position to close the hole 39–1 or 39–2 or partly close the holes 39–1, 39–2 or to be retracted from the holes 39–1 and 39–2. Similarly, the lever 40*b* is caused to be moved to a position to close the hole 39–3 or 39–4 or partly close the holes 39–1, 39–2, or to be retracted from the holes 39–3 or 39–4. As illustrated in FIG. 3B, if the first and fourth tracks on the tape in the magnetic tape cartridge (not shown) are indexed, the levers 40*a* and 40*b* is allowed to be moved so as to admit the same to close the holes 39–1, 39–4.

Figure 4:
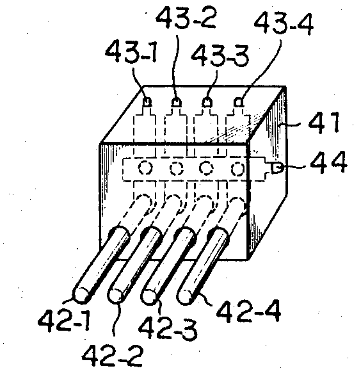
FIG. 4 is a perspective view of a switch mechanism including the switches in FIG. 1.

FIG. 4 shows one type of switch mechanisms including the switches 19–1, 19–2, 19–3 and 19–4 in FIG. 1. A switch mechanism in this instance comprises a housing 41 storing the switches 19–1, 19–2, 19–3 and 19–4 therein, and actuators 42–1, 42–2, 42–3 and 42–4 slidably provided in the housing 41 so as to be opposed to the respective switches and each one end of which extends from the housing. Now, under the position to which the levers 40*a*, 40*b* are moved, when the case is set to the tape player, the levers 40*a*, 40*b* abut against the actuators 42–1 and 42–4 to allow the actuators 42–2 and 42–3 to enter into the holes 39–2 and 39–3. Consequently, movable contacts 43–1 and 43–4 for the switches 19–1 and 19–4 are depressed by the actuators 42–1 and 42–4 to keep away from a common fixed contact 44. On the other hand, movable contacts 43–2 and 43–3 for the switches 19–2 and 19–3 are maintained in a position to contact with the common fixed contact 44. The magnetic tape stored in the case (FIG. 3A) is, therefore, reproduced at the first and fourth tracks thereof. These movable contacts 43–1, 43–2, 43–3, and 43–4 each of conductive leaf spring and are normally brought into contact with the common fixed contact 44 by elasticity of the spring.

It will readily be understood that each of the holes 39–1, 39–2, 39–3, and 39–4 has a dimension allowing each of the actuators 42–1, 42–2, 42–3, and 42–4 to freely pass therethrough.

Figure 5:
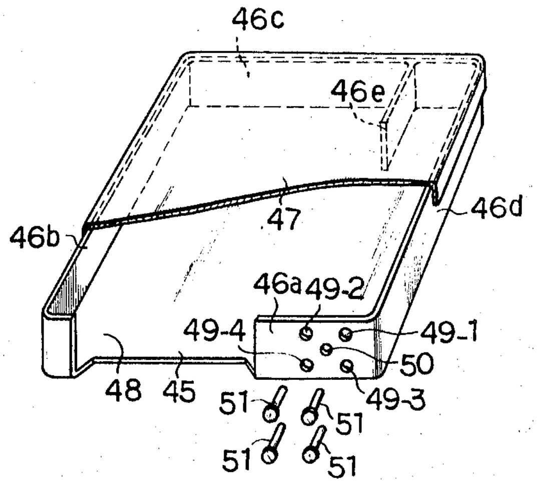
FIG. 5 is a perspective view of a further alternative embodiment of the case according to the invention.

FIG. 5 illustrates a further alternative embodiment of the case according to the present invention. The case, as is similar to the embodiment as set forth hereinbefore, comprises a base portion 45, front wall 46*a*, sidewalls 46*b*, 46*d* and a rear wall 46*c* each of which upwardly extends from the base portion 45, a partition wall 46*e* upwardly extending from the base portion so as to be perpendicular to the rear wall 46*c*, and a cover member 47. The front wall 46*a* is provided with an opening 48 similar to the opening 31(FIG. 2A). Five holes 49–1, 49–2, 49–3, 49–4, and 50 are bored through the front wall 46*a*. Four holes out of five, namely, 49*1*, *49–2, 49–3, and 49–4 are suitably plugged by the respective plug members 51.*

FIG. 6 shows another type of switch mechanisms including the switches 19–4 in FIG. 1. A switch mechanism in this instance comprises a housing 52 storing the switches 19–1, 19–2, 19–3, and 19–4 therein, actuators 53–1, 53–2, 53–3, and 53–4 slidably mounted in the housing 52 so as to be opposed to the respective switches and each end of which extends from the housing, and a guide pin one end of which is secured to the housing 52. The actuators 53–1, 53–2, 53–3, and 53–4, guide pin 54 are so arranged as to be opposed to the respective holes 49–1, 49–2, 49–3, and 50. Now, the holes 49–1 and 49–4 each receives the plug member 51 and the case is set to the tape player, the actuators 53–1, 53–4 are urged by the plug members 51 to cause the actuators 53–2, 53–3 to enter into the respective holes 49–2, 49–3 and the guide pin 54 to advance to the hole 50. As a result, the switches 19–1, and 19–4 (FIG. 1) are opened and the first and fourth tracks on the tape in the endless magnetic tape cartridge stored in the case is reproduced. Selection of track desired to be reproduced is effected by mounting the plug member 51 on the holes 49–1, 49–2, 49–3, and 49–4 each corresponding to the track. Relative position of the reproducing members such as the case, switch mechanism tape cartridge received in the case, and a magnetic head (not shown) is securely defined by inserting the guide pin 54 into the hole 50.

Where the switches 19–1, 19–2, 19–3, and 19–4 in FIG. 1 will be normally opened type ones, it will readily be understood that according to the case shown in FIGS. 2A and 2B the playing track corresponding to the selection levers moved to the second position is selected and reproduced, according to the case shown in FIGS. 3A and 3B the playing track corresponding to the holes which are not closed by the levers 40*a*, 40*b* is selected and reproduced, and that according to the case illustrated in FIG. 5 the playing track corresponding to the hole into which the plug member is inserted is selected and reproduced.

The endless magnetic tape cartridge may be divided into the classes such as having the pinch roller as shown in FIG. 2B and not having the same. The tape cartridge of the class last mentioned is provided with the window on the bottom plate of the housing for allowing the pinch roller provided in the tape player to advance and retreat into and from the window. In case that such the tape cartridge may be used, a window (not shown) similar to the above-mentioned window may be formed on the base portion 25 (FIG. 2A), 35 (FIG. 3A) and 45 (FIG. 5).

The invention and its attendant advantages will be understood from the foregoing description. It is to be understood that changes and variations may be made without departing from the spirit and scope of the invention as defined in the appended claims.

What is claimed is:

1. A case for storing an endless magnetic tape cartridge having a tape with a plurality of playing tracks to be played in a cartridge player including a track-changing device having a track selection control member, said case comprising:

a base portion;

a wall portion extending upwardly from the base portion, said wall portion consisting of a front wall, two sidewalls and a rear wall;

a cover member resting atop the wall portion;

a partition wall extending upwardly from the base portion;

a cartridge receptacle of a size sufficient to hold a single cartridge formed by the partition wall, the front wall, one of the sidewalls and the rear wall;

an opening provided in the front wall opposed to the leading edge of the cartridge received in the cartridge receptacle; and a plurality of independently and manually operable means for selectively indexing one or more playing tracks provided in the front wall, said track selection means being adapted to cooperate with said track-changing device.

2. A case in accordance with claim 1 wherein said track selection means comprises a plurality of independently manually operable selection lever means slidably provided in the front wall corresponding in number to the number of the playing tracks on the tape, said selection lever means being adapted to outwardly project at one end of the front wall and be caused to be manually moved between a first position in which a larger dimension projects from the front wall and a second position in which a smaller dimension projects from the front wall, said selection lever means being adapted to be moved to one of the positions to index the playing track on the tape to be reproduced.

3. A case in accordance with claim 1 wherein said track selection means comprises a plurality of holes provided on the front wall corresponding in number to the number of the playing tracks on the tape and at least one rotary lever means rotatably provided on the front wall and selectively manually movable to a position to close the holes, the playing track on the tape to be reproduced being indexed in the opening to the opening and closing of said holes.

4. A case in accordance with claim 1 wherein said track selection means comprises a plurality of holes provided on the front wall corresponding in number to the number of the playing tracks, and a plug member for selectively closing the holes, the playing track on the tape to be reproduced being indexed in response to the opening and closing of said holes.

5. A case in accordance with claim 1 wherein said track selection means comprises a plurality of holes provided on the front wall and corresponding in number to the number of the playing tracks, and independently and manually operable means cooperating with said holes for selectively indexing the desired playing track or tracks to be played.

* * * * *